United States Patent
Geagan, III (10) Patent No.: US 9,860,219 B2
(45) Date of Patent: *Jan. 2, 2018

(54) RUNTIME INSTANTIATION OF BROADCAST ENCRYPTION SCHEMES

(71) Applicant: INTERNATIONAL BUSINESS MACHINES CORPORATION, Armonk, NY (US)

(72) Inventor: John B. Geagan, III, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/338,023

(22) Filed: Oct. 28, 2016

(65) Prior Publication Data

US 2017/0048213 A1    Feb. 16, 2017

Related U.S. Application Data

(63) Continuation of application No. 14/671,403, filed on Mar. 27, 2015, now Pat. No. 9,516,000.

(51) Int. Cl.
  *H04K 1/00*    (2006.01)
  *H04L 29/06*   (2006.01)
  (Continued)

(52) U.S. Cl.
  CPC ........ *H04L 63/061* (2013.01); *G06F 9/45558* (2013.01); *H04L 9/08* (2013.01);
  (Continued)

(58) Field of Classification Search
  CPC ..................... H04L 63/0428; H04W 12/08
  See application file for complete search history.

(56) References Cited

U.S. PATENT DOCUMENTS 6,578,020 B1   6/2003  Nguyen
6,826,550 B2  11/2004  Brown et al.
(Continued)

FOREIGN PATENT DOCUMENTS

| CN | 1623326 A    | 6/2005 |
| CN | 101630986 A  | 1/2010 |
| EP | 1383284 A1   | 1/2004 |
| JP | 2009044652 A | 2/2009 |
| WO | 2007082124 A2| 7/2007 |

OTHER PUBLICATIONS

"Method for enriching translatable natural language style of user interface based on user input." (Apr. 13, 2010) IP.com; IPCOM000194898D.

*Primary Examiner* — Mohammed Waliullah
(74) *Attorney, Agent, or Firm* — Erik Huestis; Stephen Kenny; Foley Hoag LLP (57) ABSTRACT

Embodiments of the present invention relate to runtime instantiation of broadcast encryption schemes. In one embodiment, a method of and computer program product for runtime instantiation of broadcast encryption schemes is provided. A broadcast encryption definition is read. The broadcast encryption definition defines a broadcast encryption scheme and includes a plurality of function definitions. Based on the plurality of function definitions, it is determined whether the broadcast encryption definition defines encrypting or decrypting content. Based on the plurality of function definitions a type of the broadcast encryption scheme is determined.

20 Claims, 5 Drawing Sheets

(51) Int. Cl.
    *H04W 12/08*     (2009.01)
    *H04L 9/08*      (2006.01)
    *H04N 21/63*     (2011.01)
    *H04N 21/2347*   (2011.01)
    *H04N 21/4405*   (2011.01)
    *G06F 9/455*     (2006.01)

(52) U.S. Cl.
    CPC ...... *H04L 63/0428* (2013.01); *H04L 63/0457* (2013.01); *H04L 63/062* (2013.01); *H04N 21/2347* (2013.01); *H04N 21/4405* (2013.01); *H04N 21/63* (2013.01); *H04W 12/08* (2013.01); *G06F 2009/45587* (2013.01); *H04L 2209/805* (2013.01)

(56) References Cited

U.S. PATENT DOCUMENTS

| | | | |
|---|---|---|---|
| 6,832,214 B1 | 12/2004 | Nguyen | |
| 7,095,850 B1* | 8/2006 | McGrew | H04L 9/065 380/37 |
| 2004/0109569 A1* | 6/2004 | Ellison | G11B 20/00086 380/277 |
| 2009/0214031 A1* | 8/2009 | Jin | G09C 5/00 380/200 |
| 2013/0167128 A1* | 6/2013 | Narayana Iyer | G06F 8/41 717/143 |
| 2014/0064490 A1* | 3/2014 | Wang | H04L 9/0836 380/278 |
| 2015/0110272 A1* | 4/2015 | Kapoor | H04W 12/02 380/274 |
| 2015/0236925 A1* | 8/2015 | Bodz | H04L 41/50 709/203 |

* cited by examiner

RUNTIME INSTANTIATION OF BROADCAST ENCRYPTION SCHEMES

BACKGROUND

Embodiments of the present invention relate to broadcast encryption, and more specifically, to runtime instantiation of broadcast encryption schemes.

BRIEF SUMMARY

According to one embodiment of the present invention, a method of and computer program product for runtime instantiation of a broadcast encryption scheme is provided. A broadcast encryption definition is read. The broadcast encryption definition defines a broadcast encryption scheme and includes a plurality of function definitions. Based on the plurality of function definitions, it is determined whether the broadcast encryption definition defines encrypting or decrypting content. Based on the plurality of function definitions a type of the broadcast encryption scheme is determined.

DETAILED DESCRIPTION

A subset difference tree approach may be used in a broadcast encryption scheme to restrict authorized access to distributed content. NNL (named for Naor, Naor, and Lotspiech) provides space-efficient key allocations in broadcast encryption systems utilizing a subset difference tree. NNL uses a one-way triple function to traverse downwards through a binary tree and derive encryption keys from parent nodes, where application of the triple function allows determination of a processing key as well as left and right children of the node. Content consumers are allocated a unique small set of labels (keys) for specific starting nodes, and by applying the triple function, are able to derive any other labels and keys beneath (covered by) those starting labels. This ability to derive labels from other labels gives NNL its compactness, and in particular allows the distribution of a minimal set of keys to a client. Similarly, NNL enables the distribution of a minimal set of encryptions. Rather than distributing a version of a message encrypted for each target device, messages may be encrypted for subsets of devices using the subset difference tree approach.

A single predetermined one-way function may be applied to traverse the tree. Where this function is known in advance, an attacker may be able derive additional keys through brute force. In particular, the result of a known one-way function may be computed for all possible inputs. Once an answer matches any starting label, the one-way function has been broken, and an attacker has derived a label that she was not authorized to have. With sufficient computing power, an attacker may thereby circumvent the content protection system. The result of a successful brute force attack is potentially disastrous, as derivation of unauthorized labels would allow an attacker to impersonate any other authorized content consumer to obtain unauthorized access to content. An efficient attack may be mounted in which answers are compared to the entire set of starting labels in parallel. Comparison of one label to each computed answer is not significantly easier than comparing several labels at the same time. If an attacker has multiple sets of starting labels (e.g., multiple compromised keysets) then this parallelism is increased further. Once any label has been cracked, all keys under that label may be easily derived using a known triple function. Even the method (other than pure random number generation) used to derive the starting labels would be at risk of cracking as well.

To minimize the risk of such an attack, the one-way function may be chosen so that a brute force attack is infeasible. In particular, a function may be chosen that will require a prohibitive amount of time to crack through brute force. For example, a one-way function that uses AES-128 is generally believed to be impossible to crack at this time. However, attackers have access to increasingly large clouds (or botnets) comprising multiple computers whose average individual computation power is doubling every 18 months. With the ongoing increase in computing power, attackers can crack by brute force approximately one more bit of encryption strength each year. In addition, there are occasional technological (hardware or algorithmic) developments which allow orders-of-magnitude leaps in cracking efficiency (e.g., rainbow tables, CPU support for AES, multi-core parallelism, massive parallelism in GPUs, FPGAs, quantum computing). Given these ongoing advances, a one-way function that cannot be practically cracked at present may be cracked in the near future.

To address the risk of a brute force attack in broadcast encryption, the present disclosure provides for dynamic redefinition of broadcast encryption schemes including subset difference based schemes such as NNL and just-in-time generation of keys. By providing dynamic modification of a broadcast encryption scheme in a deployed system, the potential for an attacker to guess the function is limited. Even where an attacker knows the function used for a given participant in a broadcast encryption scheme, this usefulness of this knowledge is limited due to potential variations among multiple participants in the scheme. In addition, in response to a break in the system, the entire broadcast encryption scheme may be modified dynamically to minimize the impact of the break.

A given instance of a subset difference tree is distinguished by several features. The keyset height determines the height of the subset difference tree. The key width determines the size of each individual key. The label function determines how a label is derived from a node ID. The triple function determines the left and right traversal keys as well as the processing key of a node. Variations on these parameters are possible. For example, a given instance may have a keyset height of 9, a key width of 128 bits, and the triple function may be AES-3G as defined in AACS. In some embodiments of the present disclosure, rather than a triple function, three separate functions are defined for each of the left, right, and processing keys of a node.

In embodiments of the present invention, a just in time compiler is provided for arbitrary broadcast encryption deployments. Alternative systems, in which the parameters of a broadcast encryption deployment are predetermined, are hard-coded to use one set of parameters or a small collection of parameters. Modification of such hard-coded systems involves adding additional code to a system which may already be deployed. Modification of a deployed system may require shutting down both content consumer and content provider software to apply patches, resulting in down time. In addition, patching all providers and consumers in a widely deployed system may be prohibitively complicated and time consuming. In addition, a hard-coded system does not take advantage of hardware optimization, parallel processing, or cloud processing to increase performance.

In one aspect of the present disclosure, a programming language is provided that may be used to describe an arbitrary broadcast encryption configuration. In some embodiments, a matrix based or subset difference based scheme may be described. This language is small, simple, safe, and suitable for execution in a sandbox. Descriptions in this language may be safety-checked and compiled into native optimized sandboxed code. Such code takes full advantage of the speed of the underlying hardware without any need for runtime rechecking. Consequently, during key generation, the code may be run unfettered. This allows key generation at rates thousands of times faster than alternative approaches to key generation while maintaining superior safety.

The language is flexible, allowing an infinite number of possible arrangements to be expressed. By providing a runtime operable to interpret and compile this language, arbitrary re-initialization may be performed. This both allows modification of a deployed system without patching and also allows re-initialization during a transaction, enabling polymorphic key allocation schemes.

In some embodiments, input code in the language is tokenized and converted into a list of function calls and their operands. The list may then be interpreted at runtime. In a tokenization process, any unknown tokens may be discarded, thereby ensuring that the resulting list of function calls is valid. In some embodiments, the list of function calls may be compiled into an intermediate language prior to compilation into machine code. The intermediate language may be a known programming language such as C or Java. The intermediate language may also be an interpreted language such as Javascript, PHP, Perl, or Python. In some embodiments, the input code is compiled into bytecode suitable for execution by a virtual machine such as a Java Virtual Machine (JVM).

In some embodiments, the syntax is extensible. In such embodiments, additional functions may be added to the language of the present disclosure through the modification of the compiler or through the addition of a self-contained software module. In this way, backwards compatibility is maintained even where additional functions are rolled out.

In some embodiments, a client API is provided for requesting key generation services from a server configured to interpret the language described above. In some embodiments, a client library dispatches requests to multiple servers and marshals the responses. This approach enables massive parallelism. In some embodiments, multiple server instances are local to a given physical machine that also hosts the client. In some embodiments, multiple server instances are located throughout a network, such as a LAN, WAN or the Internet and are accessible via a network connection. In some embodiments, multiple server instances are located in a cloud and are initialized with the same broadcast encryption definition. Such a cloud deployment allows production of keys complying with a given broadcast encryption definition by many physical machines in parallel, allowing such a system to be scaled to arbitrary size.

In some embodiments, a client library is responsible for allocating subtrees to be calculated among a plurality of server instances, and then marshaling the result. In other embodiments, an intermediary server exports the client API but delegates computation to a plurality of server instances. In such embodiments, the intermediary server is responsible for marshaling the results. The marshaling entity, whether the client library or an intermediary server, is responsible for tracking the work assigned to target server instances. In some embodiments, the workload is divided into approximately computationally equivalent units of work for distribution. In other embodiments, the workload is divided into units of work whose computational complexity is proportional to the computational capacity of the target server instance. In some embodiments, the workload is divided into a plurality of small slices, and each of a plurality of server instances is assigned one or more slice.

In some embodiments, the server side code generates sets of decryption keys for provision to content consumers and encryption key bundles to encrypt individual content messages. In some embodiments, a generalized content consumer is provided that hosts a runtime capable of initialization for use with any broadcast encryption configuration.

Figure 1:
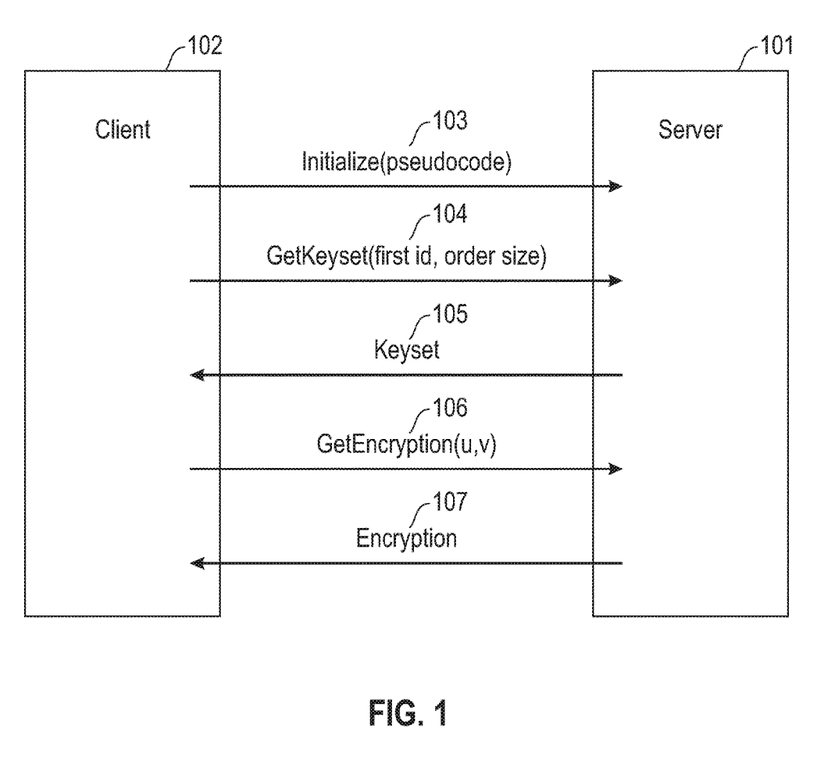
FIG. 1 depicts a schematic representation of a client/server interface in accordance with an embodiment of the present invention.

FIG. 1 depicts a schematic representation of an exemplary embodiment of a just-in-time server. Server 101 communicates with client 102 to general subset difference trees. Client 102 initializes a server instance by invoking a method 103 with pseudocode describing the requested broadcast encryption instance. Client 102 requests 104 a keyset. In response to the request, server 101 generates and returns a keyset 105 conforming to the broadcast encryption specification. Client 106 requests that a message be encrypted using argument u:uv according to the broadcast encryption specification. The encrypted message is returned 107.

In Inset 1, an exemplary definition of a subset difference broadcast encryption instance is provided. In this example, the keyset height is 25 and the keyset width is 128. A label function is provided that determines a node label from a label id by applying the AES-128 block cipher. In particular, an intermediate value x is computed by applying AES-128 decryption (denoted by aes128d) the node id using a constant. The label is computed by applying AES-128 decryption to a constant value using the intermediate value. The left, center, and right functions are similarly defined. These left, center, and right functions replace a single triple function. However, a triple function such as AES-G3 may be expressed through the language of the present disclosure. In this example, the left, right and center keys are obtained by applying AES-128 decryption to a constant using a node label and then xoring the result with the constant.

---

Inset 1 keysetheight = 25
keywidth = 128
label:

x = id aes128d 0x6795b1960f0889c19e88dbe58ab0b582
return 0x2a864c5c9f0d67160d46da2b883a7bb2 aes128e x

Inset 1 left:

c = 0x7B103C5DCB08C4E51A27B01799053BD9 x = c aes128d label return x xor c center:

c = 0x7B103C5DCB08C4E51A27B01799053BDA x = c aes128d label return x xor c

Inset 1 right:

c = 0x7B103C5DCB08C4E51A27B01799053BDB
x = c aes128d label
return x xor c

An arbitrary broadcast encryption scheme may be described using the language of the present disclosure. For example, a stronger scheme using larger keys is provided at Inset 2. A weaker scheme using smaller keys and DES-56 in place of AES is provided at Inset 3. A scheme with a keyset height of 1, which would be suitable for use in a public-key infrastructure deployment, is provided at Inset 4. Finally, an example suitable for use in a content consumer device is provided in Inset 5, which omits the label function.

Inset 2 keysetheight = 35
keywidth = 256
label:

x = id xor

0x3fa99789dfe657702be73f309343a72fc9d4c509d88a389ab053783d9c320500 x = x aes256d

0x0b4f2434848117b0e1025de2a3e87261f3a99661afe73870250fb9750ac78ea3 x = x aes256e

0x38fa51f7338b83988fbd8aebb23f6ef626264d4e3072e3bf602519d89fae4dd9 return x aes256d

0x15b47f0ff26dbf7410f1e440cdc3beb9d77c838c0b1596167ad4f0cb6b904e00 left:

c = 0x966567a6cab08e2dc9575f6ebe0ed0883a6365b41bfb4b43998fd81383addac9 x = c aes256d label return x xor c center:

c = 0xd1a18885f1bb9d1aad202e47e9ea2712393712e2b751ea7d1041c361c8725213 x = c aes256d label return x xor c right:

c = 0x49fb3fffa59e29576d27939ddaa3c2e3e50e94968c47f6911fb8762105b0abd8 x = c aes256d label return x xor c

Inset 3 keysetheight = 9
keywidth = 56
label:

return id des56e 0x2a864c5c9f0d67
left:

return 0x7B103C5DCB08C4 des56d label
center:

return 0x7B103C5DCB08C5 des56d label
right:

return 0x7B103C5DCB08C6 des56d label

Inset 4 keysetheight = 1
keywidth = 128
left:

x = id xor 0x73d629cefe93a38ce1de0707cb1d5cae
x = x aes128d 0x6795b1960f0889c19e88dbe58ab0b582
x = x aes128e 0x4f089beca04345533e5c5624af6f414a
return x aes128d 0x2a864c5c9f0d67160d46da2b883a7bb2
center:

c = 0x7B103C5DCB08C4E51A27B01799053BDA
x = c aes128d label
return x xor c
right:

x = id xor 0x73d629cefe93a38ce1de0707cb1d5cae
x = x aes128d 0x6795b1960f0889c19e88dbe58ab0b582
x = x aes128e 0x4f089beca04345533e5c5624af6f414a
return x aes128d 0x2a864c5c9f0d67160d46da2b883a7bb2

Inset 5 keysetheight = 22
keywidth = 128
left:

c = 0x7B103C5DCB08C4E51A27B01799053BD9
x = c aes128d label
return x xor c
center:

c = 0x7B103C5DCB08C4E51A27B01799053BDa
x = c aes128d label
return x xor c
right:

c = 0x7B103C5DCB08C4E51A27B01799053BDb
x = c aes128d label
return x xor c

In addition to the examples above, the system of the present disclosure may be used to define a matrix-based broadcast encryption scheme. As an example, a matrix-based scheme may be generated by providing row and column designations in place of the label function in the above examples. One such example is provided at Inset 6.

Inset 6 guid = 0x3ef89a7b0f7b36acceced7796372ce37
label = 64
x = row lshift 32
x = x xor column
x = 0x1a47916cfb84a731 xor x
x = 0x64cd341459751987 des64d x
x = x des64e 0x25cd35c37db6b4be
return x des64d 0x64cd341459751987
encode = 64
x = label xor 0x66ada0ad3677a300
return message des64d x
decode = 64
x = label xor 0x66ada0ad3677a300
return message des64e x In the example of Inset 6, a content consumer may be provided with a decoder algorithm as provided in Inset 7 coupled with a keyset as provided in Inset 8. When encrypted content is provided by a content provider, a media key block (MKB) is generated to enable an authorized content consumer to decrypt that content. An exemplary media key block according to an embodiment of the present disclosure is provided at Inset 9. A content consumer may then receive and decrypt content encrypted by a content provider using the algorithm given in Inset 6. In the exemplary MKB and keyset, column and row designations in a matrix are separated by an '@' sign at the beginning of a line, e.g., "2@13". However, the present disclosure is not limited to this grammar and it will be appreciated that various alternative grammars and encodings may be adopted without departing from the scope of this disclosure.

Inset 7 guid = 0x3ef89a7b0f7b36acceced7796372ce37
decode = 64
x = label xor 0x66ada0ad3677a300
return message des64e x

Inset 8 guid = 0x3ef89a7b0f7b36acceced7796372ce37
0@13=0xa7c8bdc4c6799f2a
1@9=0x84a5dd9a5003ce3f
2@13=0xb1758e53670a2836
3@2=0x33bff84797815117
4@5=0x3c7592fde3608dee
5@15=0xbd4f6d76c8980cf9
6@7=0x8503627e0875c8ec
7@15=0x45d5662108e5df1f

Inset 9 guid = 0x3ef89a7b0f7b36acceced7796372ce37
0@0=0xfc4774cd7fcf9379
0@2=0xb2fe953bd7317720d
0@4=0xf7e451426e28d5c5
0@6=0x3bdcae0be557bbae
0@8=0x6541d416083e58ad
0@10=0xdc35b2afb0cadc93
0@12=0x5b2b3c1e7104160d
0@14=0x46a55331e1a91cf9

In some embodiments, a single file may include both a definition of the decryption scheme necessary for a content consumer and the keyset for that consumer. In this way, a content consumer may be completely configured to participate in a broadcast encryption system simply and dynamically. A content consumer according to embodiments of the present disclosure, upon receipt of a definition, infers from that definition the type of scheme defined. For example, the present of a left and right function allows the inference that a tree-based system is being defined, while row and column designators allow the inference that a matrix based system is being defined. As shown in the above examples, a Globally Unique Identifier (GUID) may be included in a definition for a content consumer to associate MKBs with the appropriate keyset. In some embodiments, where a content consumer lacks the appropriate keyset for an MKB, the content consumer may request that a new keyset be provided.

As will be apparent from above, multiple implementations of the present subject matter may freely interoperate. For example, an interpreter implementation that reads in human-readable code can likewise interoperate with a virtual machine implementation that reads equivalent bytecode. Provided that a given encoding of the definition conforms with the same grammar, an arbitrary encoding may be adopted. For further illustration, a FPGA may read and execute bytecode describing a broadcast encryption scheme definition. Similarly, a CPU or coprocessor may be provided that directly executes a definition conforming to a specialized instruction set. A translator or cross-compiler may be provided to convert a definition between various encodings and instruction sets, e.g., between bytecode and human-readable code.

As will also be apparent from the above, a given implementation of the present subject matter may serve as a content consumer, content provider, or both based on the definitions that it reads. For example, an integrated coprocessor may be adapted to natively execute bytecode as described above. The coprocessor may be provided with a definition of a matrix-based scheme including the functions necessary for encryption. The coprocessor may also be provided with a definition of a subset difference based scheme, but only be provided with the information necessary to decrypt content. In this example, the coprocessor would enable a device to act as a consumer and provider using two separate broadcast schemes.

In some embodiments, the client API comprises an initialization function that initializes a key generator with a description of a broadcast encryption instance. In some embodiments, the description is provided in pseudocode, which may be of the form provided above in Inset 1-5. The client API may include additional functions for generating a keyset or encrypted values after initialization has occurred.

The just-in-time approach of the present disclosure enables zero downtime transition between broadcast encryption configurations. In addition, it enables the use of broadcast encryption schemes in which parameters vary throughout the keyset or over time. In particular, the just-in-time approach of the present disclosure enables a flexible implementation of polymorphic broadcast encryption schemes such as those described in the commonly invented and assigned application entitled POLYMORPHIC ENCRYPTION KEY ALLOCATION SCHEME. In addition, variable-height keysets may be used.

In some embodiments, the broadcast encryption descriptions use 256 bit variables. In other embodiments, larger or smaller variable sizes are used. In some embodiments, functions that expect a fixed length input smaller than the variable length, such as AES-128, are applied to the least significant bits of an input variable. By allocating 256 bits to the label and node id, a 256 bit tree-space becomes available. In particular, the keyset height is constrained to one less than the key length in bits. In embodiments with larger variable sizes, there is a corresponding increase in the size of the tree-space.

In some embodiments, the keywidth must be a multiple of 8 bits. In other embodiments, the keywidth is not constrained to be a multiple of 8 bits, and bit-packing is applied to align input values to byte boundaries.

The broadcast encryption generation may be provided by a linked library. Alternatively, broadcast encryption generation may be provided by a standalone program that is accessible through a messaging API. In some embodiments, the standalone broadcast encryption generation program may be accessible through a local pipe. In other embodiments, the broadcast encryption generation program may be accessible through a remote port, for example by piping traffic on that port to the broadcast encryption generation program via inetd or netcat. In some embodiments, multiple network accessible broadcast encryption generators are available, allowing distributed processing. In some embodiments, remote broadcast encryption generation programs are accessible through an encrypted link such as those provided by IPSec or SSH.

In some embodiments, broadcast encryption generation is provided as a cloud service. By parallelizing broadcast encryption generation in the cloud, an entire broadcast encryption instance such as that provided in AACS may be generated on a just-in-time basis. For example, all of AACS may be generated using 12 cores in approximately seven minutes. Using 5000 cores, all of AACS may be generated in approximately one second.

In some embodiments, broadcast encryption generation is built into a small device to enable device-specific encryption. Such devices include car keys, credit cards, badge readers, nano-computers, power meters, implanted medical devices such as pacemakers, traffic lights. In general, any embedded wirelessly-accessible device is suitable for use with the just-in-time broadcast encryption generation of the present disclosure. In some embodiments, an broadcast encryption specification is provided in an initialization step via a secure channel.

Figure 2:
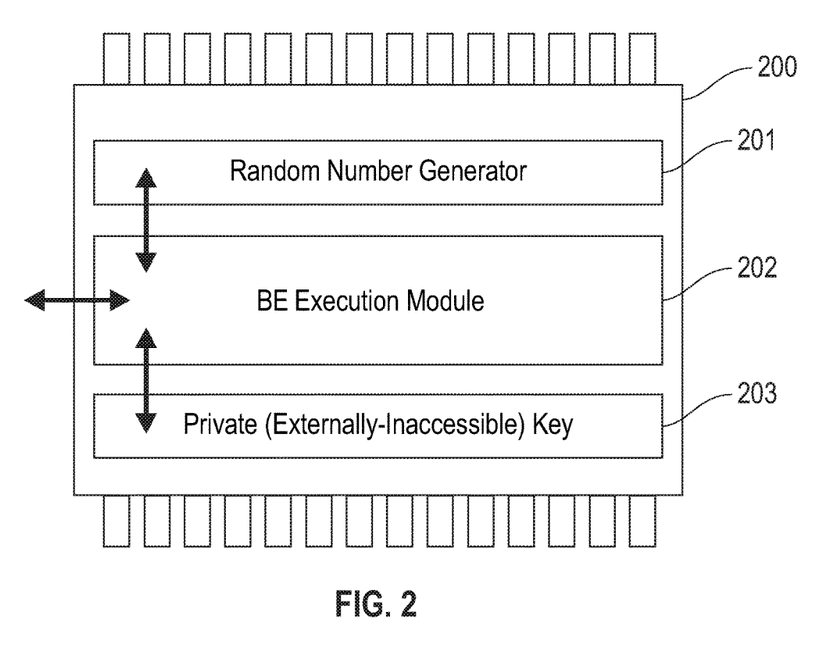
FIG. 2 depicts an exemplary embedded module according to an embodiment of the present disclosure.

Referring to FIG. 2, an exemplary embedded module is provided. Embedded module 200 may be an ASIC or other circuit. Embedded module 200 may be included in a mobile device or other content consumer. Embedded module 200 includes random number generator 201, broadcast encryption (BE) execution module 202, and private key 203. Broadcast encryption execution module 202 has access to random number generator 201 and to private key 203. Broadcast encryption execution module 202 may interface with other components in a device. Broadcast encryption execution module 202 provides several broadcast encryption services. A random number may be requested of broadcast encryption execution module 202. Broadcast encryption execution module requests a random number of random number generator 201 and returns it to the requester. In an initialization step, a broadcast encryption definition as discussed above is provided to broadcast encryption execution module 202. Broadcast encryption execution module 202 encrypts the definition using private key 203. The encrypted definition may then be stored in computer readable storage in the device for later retrieval. Broadcast encryption encryption module 202 generates and returns a key for an argument u:uv when provided with the encrypted definition. Broadcast encryption encryption module 202 encodes and returns an argument message according to argument u:uv when provided with the encrypted definition. Broadcast encryption encryption module 202 decodes and returns a message when provided with the appropriate client keys, the encrypted definition, and argument u:uv. The client keys may be stored outside broadcast encryption encryption module 202.

In addition to distribution of encrypted data as discussed above, the just-in-time NNL generation of the present disclosure may be used to locate leaked keys rapidly. In addition, it may be used to simulate attacks using realistic datasets.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
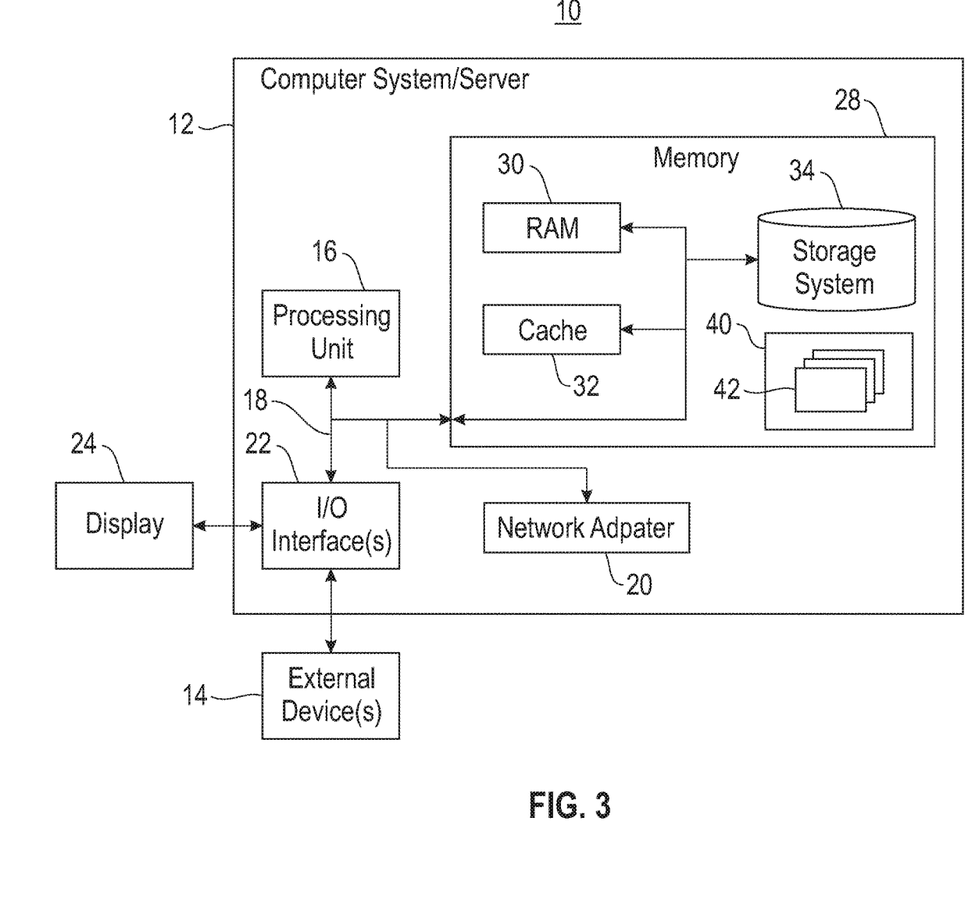
FIG. 3 depicts a cloud computing node according to an embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
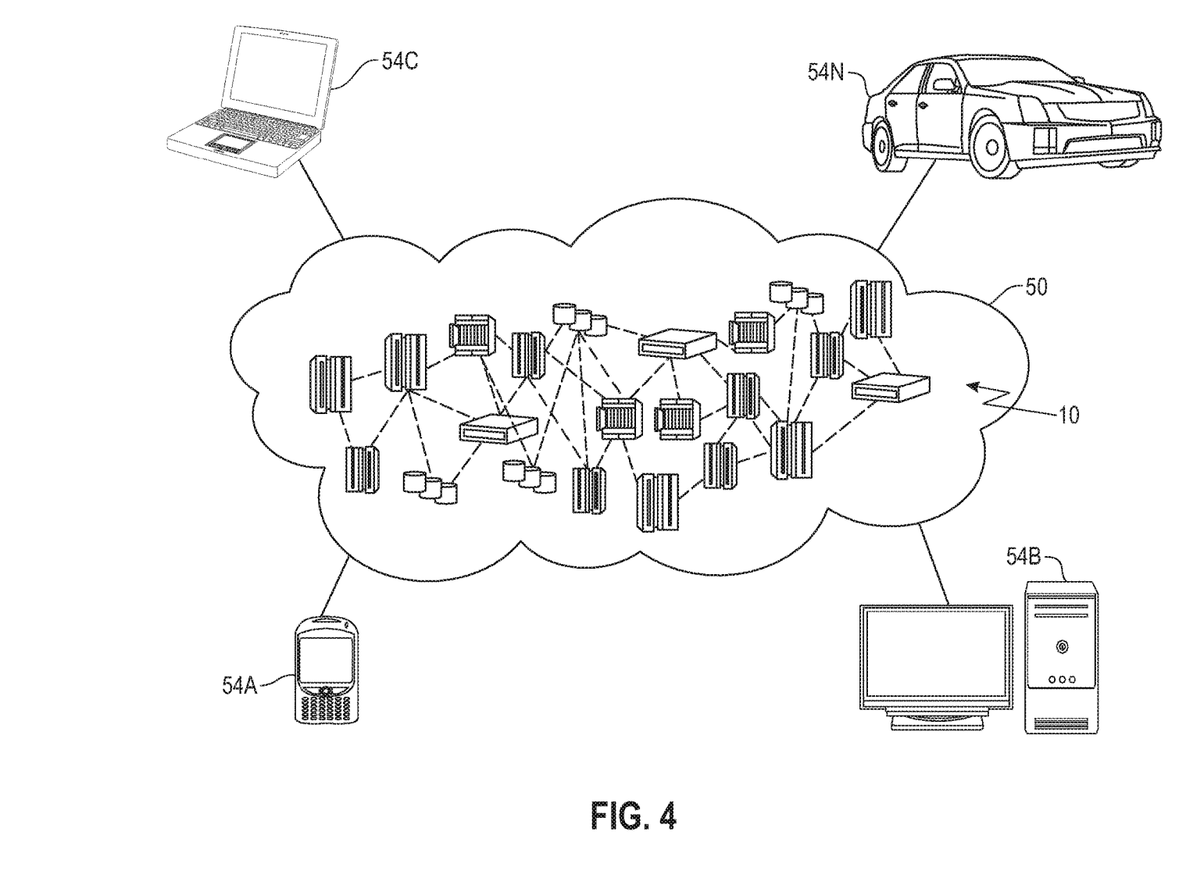
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
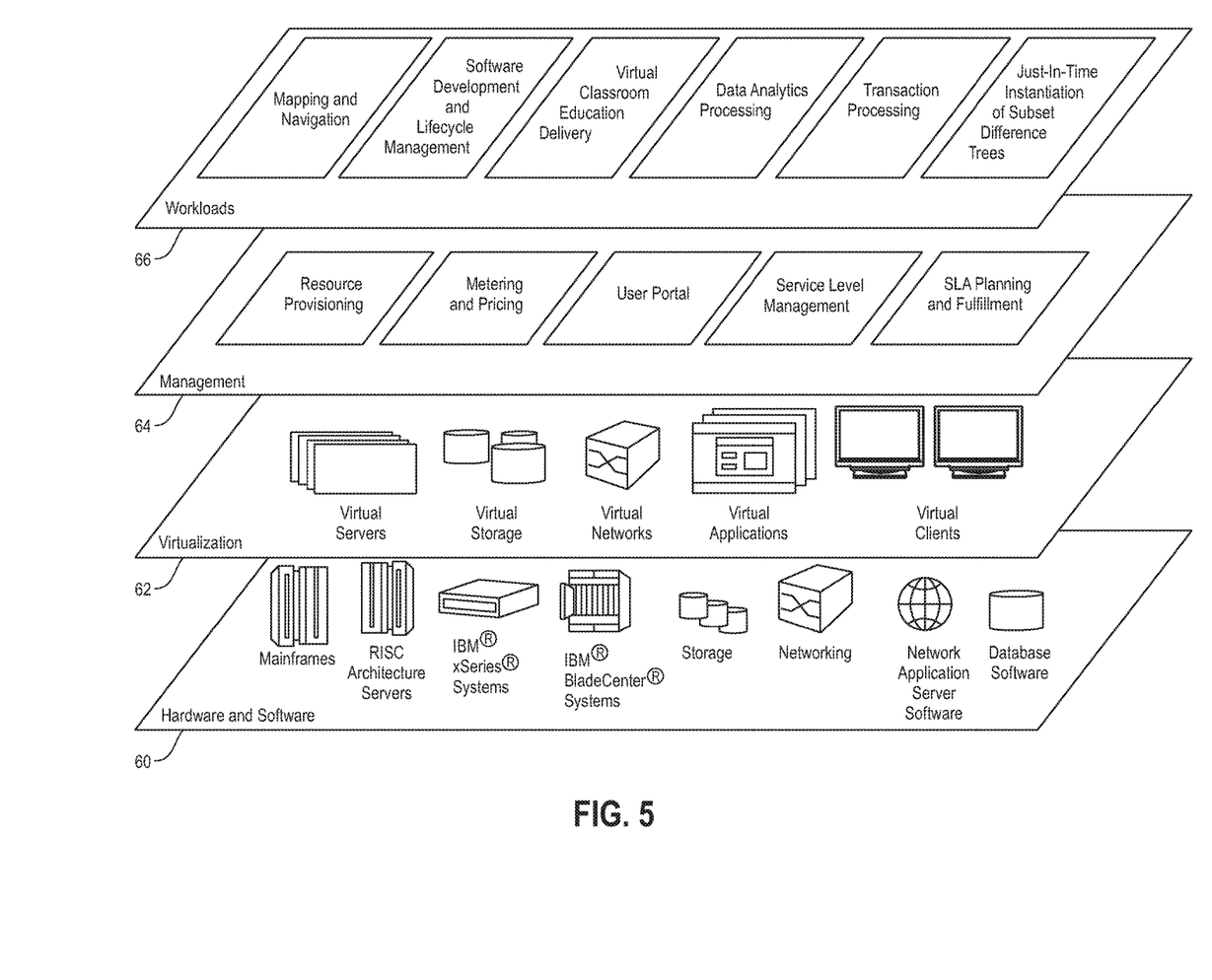
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and runtime instantiation of broadcast encryption schemes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   reading a broadcast encryption definition, the broadcast encryption definition defining a broadcast encryption scheme and comprising a plurality of function definitions, the plurality of function definitions comprising a first, second, and third function definition;
   based on the plurality of function definitions, determining whether the broadcast encryption definition defines encrypting or decrypting content;
   translating the broadcast encryption definition into executable code;
   executing the executable code to generate a key bundle conforming to the broadcast encryption scheme, the bundle comprising a first cryptographic key; and
   executing the executable code to generate a key block conforming to the broadcast encryption scheme, a content cryptographic key being obtainable by:
      determining a first, second, and third cryptographic function corresponding to the first, second, and third function definition; and
      traversing a subset difference tree using the first cryptographic key and the first, second, and third cryptographic function to obtain a content cryptographic key.

2. The method of claim 1, wherein the plurality of function definitions comprises left and right traversal functions.

3. The method of claim 1, wherein the broadcast encryption definition comprises a height, key width, column count, row count, or dimension parameter.

4. The method of claim 1 wherein the plurality of function definitions comprises a label function.

5. The method of claim 1, wherein the broadcast encryption definition comprises at least one key.

6. The method of claim 1, wherein the broadcast encryption definition defines encrypting content, the method further comprising:
   reading content;
   generating a media key block for the content conforming to the broadcast encryption scheme.

7. The method of claim 1, further comprising:
   generating a keyset conforming to the broadcast encryption scheme.

8. The method of claim 1, further comprising:
   reading content;
   encrypting the content according to the broadcast encryption scheme.

9. The method of claim 1, wherein the broadcast encryption definition defines decrypting content, the method further comprising:
   reading encrypted content;
   reading a media key block conforming to the broadcast encryption scheme; and
   based on the broadcast encryption scheme, decrypting the content using the media key block.

10. The method of claim 1, wherein the broadcast encryption definition comprises pseudocode.

11. The method of claim 1, wherein the broadcast encryption definition conforms to a grammar.

12. The method of claim 11, wherein the grammar includes no loops.

13. The method of claim 1, wherein the broadcast encryption definition comprises bytecode.

14. The method of claim 1, wherein the executable code comprises bytecode.

15. The method of claim 1, wherein executing the executable code comprises instantiating a virtual machine.

16. The method of claim 1, wherein the executable code comprises an interpreted language.

17. The method of claim 1, wherein the executable code comprises native code.

18. The method of claim 1, wherein the executable code is executed as a service in a cloud environment.

19. A computer program product for runtime instantiation of a broadcast encryption scheme, the computer program product comprising a computer readable storage medium having program instructions embodied therewith, the program instructions executable by a processor to cause the processor to:
   read a broadcast encryption definition, the broadcast encryption definition defining a broadcast encryption scheme and comprising a plurality of function definitions, the plurality of function definitions comprising a first, second, and third function definition;
   based on the plurality of function definitions, determine whether the broadcast encryption definition defines encrypting or decrypting content;
   translate the broadcast encryption definition into executable code;
   execute the executable code to generate a key bundle conforming to the broadcast encryption scheme, the bundle comprising a first cryptographic key; and
   execute the executable code to generate a key block conforming to the broadcast encryption scheme, a content cryptographic key being obtainable by:
      determining a first, second, and third cryptographic function corresponding to the first, second, and third function definition; and traversing a subset difference tree using the first cryptographic key and the first, second, and third cryptographic function to obtain a content cryptographic key.

20. The computer program product of claim 19, the program instructions further executable by the processor to cause the processor to:

generate a keyset conforming to the broadcast encryption scheme.

* * * * *